(12) United States Patent
Velissarios et al.

(10) Patent No.: US 10,742,395 B2
(45) Date of Patent: Aug. 11, 2020

(54) HARDWARE BLOCKCHAIN ACCELERATION

(71) Applicant: Accenture Global Solutions Limited, Dublin (IE)

(72) Inventors: John Velissarios, London (GB); Callum Stuart Hyland, London (GB); Laurence Richard Freeman, London (GB); Piergiorgio Rettaroli, Rome (IT); Ennio Acernese, Rome (IT); Pasquale Di Tucci, Latina (IT); Salvatore Gifuni, Rome (IT)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/265,748

(22) Filed: Feb. 1, 2019

(65) Prior Publication Data

US 2019/0182031 A1 Jun. 13, 2019

Related U.S. Application Data

(63) Continuation of application No. 15/832,729, filed on Dec. 5, 2017, now Pat. No. 10,243,731.

(30) Foreign Application Priority Data

Jan. 27, 2017 (EP) ..................... 17425005

(51) Int. Cl.
*H04L 9/06* (2006.01)
*H04L 29/06* (2006.01)
(Continued)

(52) U.S. Cl.
CPC .............. *H04L 9/0637* (2013.01); *G06F 9/54* (2013.01); *G06F 21/10* (2013.01); *G06F 21/72* (2013.01); *H04L 9/0861* (2013.01); *H04L 9/14* (2013.01); *H04L 9/30* (2013.01); *H04L 9/3247* (2013.01); *H04L 9/3263* (2013.01); *H04L 63/04* (2013.01); *H04L 63/08* (2013.01); *H04L 63/0853* (2013.01); *H04W 12/10* (2013.01);
(Continued)

(58) Field of Classification Search
None
See application file for complete search history.

(56) References Cited

U.S. PATENT DOCUMENTS 7,369,657 B2 5/2008 Eldeeb
7,644,266 B2 1/2010 Ahuja et al.
(Continued)

OTHER PUBLICATIONS

Castro, M. et al., "*Practical Byzantine Fault Tolerance*,"Proceddings of the Third Symposium on Operating Systems Design and Implementation, Feb. 1999, New Orleans, {castro,liskov}@lcs.mit.edu. (14p).
(Continued)

*Primary Examiner* — Saleh Najjar
*Assistant Examiner* — Michael W Chao
(74) *Attorney, Agent, or Firm* — Brinks Gilson & Lione

(57) ABSTRACT

Hardware acceleration supports complex software processes. In particular, a hardware security module provides encryption support for transaction chains. In one implementation, the security module circuitry provides high-speed security features and acceleration of the security features for blockchain processing.

20 Claims, 9 Drawing Sheets

(51) Int. Cl.
*G06F 21/10* (2013.01)
*H04W 12/10* (2009.01)
*G06F 9/54* (2006.01)
*G06F 21/72* (2013.01)
*H04L 9/08* (2006.01)
*H04L 9/14* (2006.01)
*H04L 9/30* (2006.01)
*H04L 9/32* (2006.01)

(52) U.S. Cl.
CPC .......... *H04L 9/0877* (2013.01); *H04L 9/0897* (2013.01); *H04L 9/3234* (2013.01)

(56) References Cited

U.S. PATENT DOCUMENTS

| | | | |
|---|---|---|---|
| 8,694,781 | B1 | 4/2014 | Griffin et al. |
| 8,892,868 | B1 | 11/2014 | Jenks et al. |
| 9,053,480 | B1 | 6/2015 | Jenks et al. |
| 9,344,455 | B2 | 5/2016 | Himawan et al. |
| 10,043,029 | B2 | 8/2018 | Murray |
| 10,057,243 | B1* | 8/2018 | Kumar ................. H04W 8/005 |
| 10,102,526 | B1* | 10/2018 | Madisetti ............. H04L 9/3239 |
| 10,237,259 | B2* | 3/2019 | Ronda ................. H04L 9/08 |
| 10,541,811 | B2* | 1/2020 | Peddada ............. H04L 9/0877 |
| 10,552,442 | B1* | 2/2020 | Lusk ................... H04L 63/08 |
| 10,554,392 | B2* | 2/2020 | Rubin ................. H04L 9/0877 |
| 10,572,315 | B1* | 2/2020 | Lusk ................... G06F 9/541 |
| 2004/0098600 | A1* | 5/2004 | Eldeeb ................ G06F 21/72 713/189 |
| 2004/0143762 | A1 | 7/2004 | Audebert et al. |
| 2006/0017969 | A1 | 1/2006 | Ly et al. |
| 2006/0161790 | A1 | 7/2006 | Hunter et al. |
| 2007/0011736 | A1 | 1/2007 | Kalibjian et al. |
| 2008/0034199 | A1 | 2/2008 | Nair et al. |
| 2010/0156888 | A1 | 6/2010 | Luk et al. |
| 2011/0010720 | A1 | 1/2011 | Smith et al. |
| 2012/0005263 | A1 | 1/2012 | McWhirter et al. |
| 2012/0131354 | A1* | 5/2012 | French ................ G06F 21/602 713/189 |
| 2012/0284526 | A1 | 11/2012 | Arnold et al. |
| 2013/0010955 | A1 | 1/2013 | Lu et al. |
| 2013/0067090 | A1 | 3/2013 | Batrouni et al. |
| 2014/0282936 | A1 | 9/2014 | Fitzgerald et al. |
| 2015/0358161 | A1 | 12/2015 | Kancharla et al. |
| 2015/0358294 | A1 | 12/2015 | Kancharla et al. |
| 2015/0358313 | A1 | 12/2015 | Hussain et al. |
| 2015/0381580 | A1 | 12/2015 | Graham, III et al. |
| 2016/0077853 | A1 | 3/2016 | Feng et al. |
| 2016/0098723 | A1* | 4/2016 | Feeney ............... G06Q 20/4016 705/75 |
| 2016/0125201 | A1 | 5/2016 | Villatel et al. |
| 2016/0182470 | A1 | 6/2016 | Rubin et al. |
| 2016/0260169 | A1 | 9/2016 | Arnold et al. |
| 2016/0277373 | A1 | 9/2016 | Murray |
| 2016/0292672 | A1* | 10/2016 | Fay ..................... G06Q 20/363 |
| 2016/0321751 | A1* | 11/2016 | Creighton, IV ....... G06Q 40/04 |
| 2017/0237554 | A1* | 8/2017 | Jacobs ................. H04L 9/0819 713/171 |
| 2017/0293669 | A1* | 10/2017 | Madhavan ............ G06Q 40/04 |
| 2017/0338967 | A1* | 11/2017 | Lewison ............... H04L 9/3268 |
| 2017/0353309 | A1* | 12/2017 | Gray ..................... G06F 21/53 |
| 2018/0039667 | A1* | 2/2018 | Pierce ................. G06F 16/2379 |
| 2018/0060596 | A1 | 3/2018 | Hamel et al. |
| 2018/0075536 | A1* | 3/2018 | Jayaram ............... G06Q 20/108 |
| 2018/0300489 | A1 | 10/2018 | Roth et al. |
| 2018/0367316 | A1* | 12/2018 | Cheng .................. H04L 9/0897 |
| 2019/0068367 | A1* | 2/2019 | Baughman .......... G06F 21/6245 |
| 2019/0130394 | A1* | 5/2019 | Stollman .............. H04L 9/0637 |
| 2019/0149600 | A1* | 5/2019 | Duan .................... G06F 21/64 380/28 |
| 2019/0158272 | A1* | 5/2019 | Chopra ................. H04L 9/3247 |
| 2019/0280864 | A1* | 9/2019 | Cheng .................. H04L 9/0894 |
| 2020/0045028 | A1* | 2/2020 | Norum ................. H04L 9/3242 |

OTHER PUBLICATIONS

Deloitte—Bitcoin, Blckchain & Distributed Ledgers: Caught Between Promise and Reality, Centre for the Edge (Australia), (52p).
Government Office for Science—Distributed Ledger Technology: Beyond Block Chain—A Report by the UK Government Chief Scientific Advisor, Government Office for Science, London, England, 2016, www.gov.uk/go-science, (88p).
IBM 4767-002 PCIe Cryptographic Coprocessor (HSM), IBM 4767 Pcle HSM, Apr. 2016, www.ibm.com/security/cryptocards, (6p).
Symbiont Solution Brief, "*Securing Symbiont Smart Securities™ with SafeNet HSMs*," Germalto Security to Be Free, Mar. 28, 2016, (2p).
Wang, Yongge, "*Public-Key Cryptography Standards: PKCS*,"University of North Carolina at Charlotte, (19p).
Australian Patent Office, Examination Report No. 1 for Australian Application No. 2017276160 dated May 11, 2018, pp. 1-6.
European Patent Office, Extended European Search Report in European Application No. 17208368.5 dated Jun. 14, 2018, pp. 1-8.
Australian Examination Report No. 2, dated Nov. 20, 2018, pp. 1-5, issued in Australian Patent Application No. 2017276160, Offices of IP Australia, Woden ACT, Australia.
Cachin, Christian; Architecture of the Hyperledger Blockchain Fabric; 2016; Retrieved from the Internet <URL: https://pdfs.semanticscholar.org/f852/c5f3fe649f8a17ded391df0796677a59927f pp. 1-4, as printed. (Year: 2016).
Coleridge, Robert; The Cryptography API, or How to Keep a Secret; 1996; Retrieved from the Internet <URL: https://msdn.microsoft.corn/en-us/library/ms867086.aspx pp. 1-13, as printed. (Year: 1996).
Cross et al.; Windows 2000 Server and PKI: Using the nCipher Hardware Security Module; 2001; Retrieved from the Internet <URL: https://technet.microsoft.com/en-us/library/dd277354.aspx pp. 1-17, as printed. (Year: 2001).
No stated author; Microsoft Technet—Hardware Security Module (HSM); 2016; Retrieved from the Internet <URL: https://web.archive.org/web/20161107055745/https://social.technet.microsoft.com/wiki/contents/articles/10576.hardware-security-module-hsm.aspx pp. 1-1, as printed. (Year: 2016).

\* cited by examiner

HARDWARE BLOCKCHAIN ACCELERATION

CROSS REFERENCE

This application is a continuation of U.S. patent application Ser. No. 15/832,729 filed Dec. 5, 2017, which claims priority to European application number 17425005.0, filed 27 Jan. 2017, which is entirely incorporated by reference.

TECHNICAL FIELD

This disclosure relates to computer hardware acceleration of software processes. This disclosure also relates to hardware security support for software processes that support transaction chains, including blockchains.

BACKGROUND

Rapid advances in electronics and communication technologies, driven by immense customer demand, have resulted in newly emerging complex network transaction chains. Improvements in the hardware and software implementations of the underlying processing for the transaction chains will increase the security, features, and speed of the implementations.

DETAILED DESCRIPTION

Figure 1:
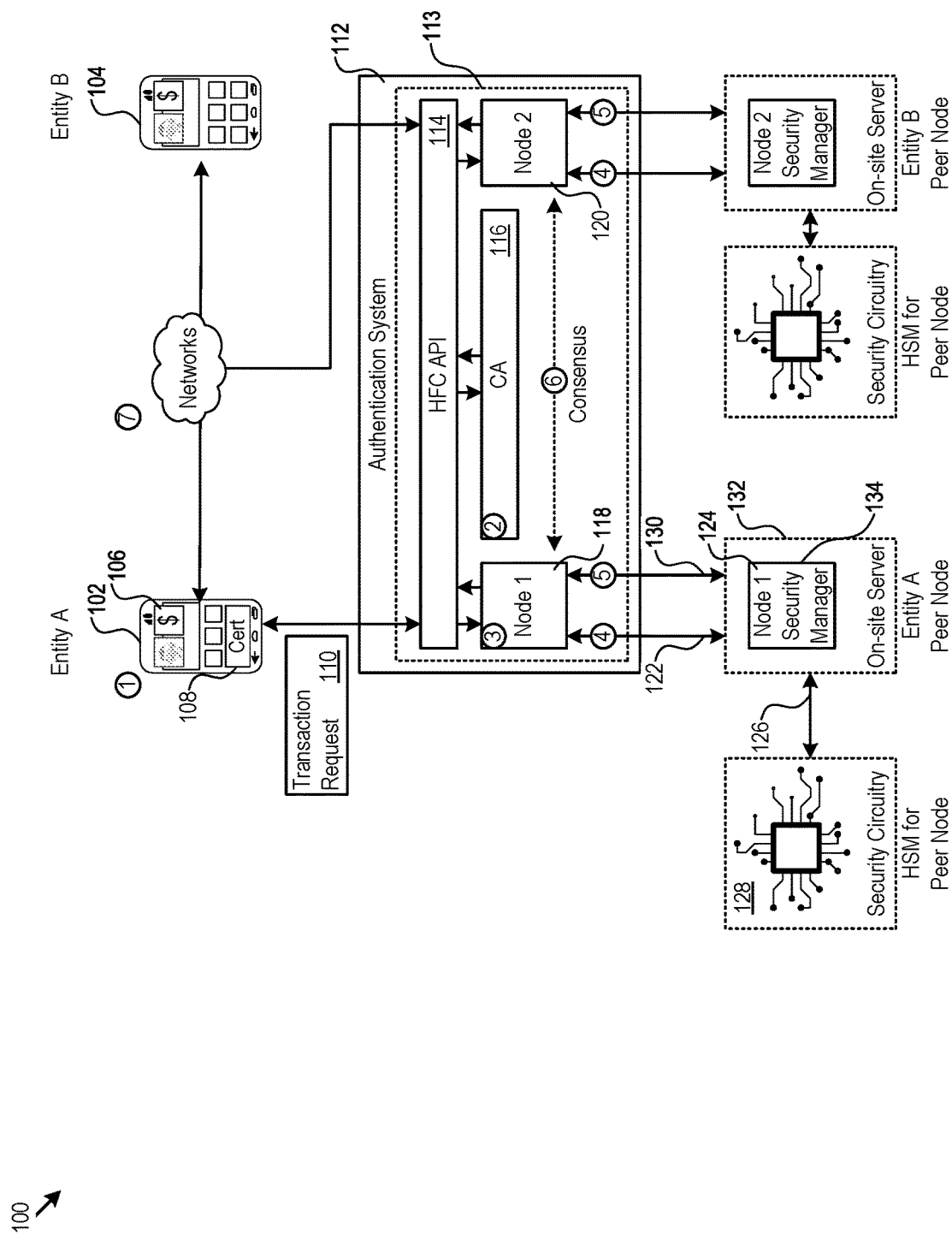
FIG. 1 shows a hardware accelerated transaction architecture.

FIG. 1 shows an example hardware accelerated transaction architecture 100 ("architecture" 100) that provides efficient and secure execution of complex transactions between entities. The entities may vary widely, and may be, as a few examples, hardware systems, software processes, or individuals. In FIG. 1, the smartphones 102 and 104 are shown as an example hardware platforms that permit entities to engage in transactions with support by the architecture 100. In this example, Entity A is associated with the smartphone 102 and Entity B is associated with the smartphone 104. In the example of FIG. 1, Entity A will engage in a digital exchange with Entity B. The digital exchange may be, e.g., a transfer of value between accounts held at different financial institutions. FIG. 1 provides one technological backdrop for a discussion of the technical solutions in hardware acceleration, but note that the hardware acceleration may be implemented in many other system contexts to support transactions of widely varying types.

In the example in FIG. 1, a smartphone application 106 accepts transaction input from Entity A that specifies a transaction amount and a transaction recipient: Entity B in this example. Smartphone 102 and 104 store an enrollment certificate 108 which the smartphone application 106 passes, e.g., in a transaction request 110, to an authentication system 112. The authentication system 112 may, as one example, implement a hyperledger fabric client (HFC) 113, e.g., in dedicated hardware or in a virtual machine or docker container for a virtual machine. An authentication interface 114 includes an exposed authentication application programming interface (API)) that receives the transaction request 110. The authentication system 112 may provide further layers of security, e.g., by requiring the transaction request 110 to travel over hypertext transfer protocol secure sockets (HTTPS), secured by transport layer security (TLS). (Logic flow (1) in FIG. 1.)

The enrolment certificate achieves authentication by encrypting the payload from the smartphone 102 with a public key associated with the enrolment certificate. The counterpart private key is securely held within the HFC certificate authority (CA) 116. The private key allows the authentication system 112 to verify the request. (Logic flow (2) in FIG. 1.)

A membership service running at a system node, e.g., the system node 118, may verify the account for Entity A that is specified in the transaction request 110. In addition, a transaction CA generates a unique transaction token. The transaction token uniquely identifies each transaction and is used to sign the request. The certificate allows the request to be passed into the validating peer node for Entity A 132 (e.g., an on-site server supporting operations for Entity A), where is it received at security controller circuitry 134. The security controller circuitry 134 responsively invokes the processing chaincodes. Chaincodes are the programmatic logic implemented to specifically support an implementation of the data storage layer, e.g., a blockchain shared ledger. In the example noted regarding transferring value, the chaincode is called to update the balances of two accounts in the shared global ledger. These accounts are stored in a serialized, encrypted format to provide separation of concerns for the systems. In other words, all of the accounts for the sender are encrypted with the sender's peer node (e.g., bank A) keys, and cannot be decrypted by the receiver's peer node (e.g., bank B) keys, and vice versa. Accordingly, a request for encryption or decryption is sent to the relevant system hardware security module (HSM), e.g., the HSM 128 which supports the peer node for Entity A 132. (Logic flow (3) in FIG. 1.) Example HSMs include, but are not limited to, the nShield Solo™, nShield Edge™, and nShield Connect™ devices available from Thales e-Security.

In one implementation, the serialized, encrypted format is a Java script object notation (JSON) file, but other representations are also suitable. The format includes the account data (e.g., sender, recipient, quantity, timestamp, and other data) and a 'cipher' field. Upon encryption, the account data within the account is encrypted in the peer node HSM and the output is placed in the 'cipher' field. The peer node then resets selected fields within the account data, e.g., by setting pre-determined sensitive data fields to zero. The security controller circuitry 134 may employ symmetric cryptography, with all keys remaining securely in the HSMs. Each account includes a uniform resource locator (URL) field that specifies the URL for the security manager with which it was onboarded. Accordingly, any peer node may view the account and locate the API (via the URL field) to request encryption/decryption of an account.

In more detail, the chaincode sends a network request 122 to the security controller interface 124 which (preferably) has a hardware support interface 126 to the HSM 128. The interfaces 124 and 126 may include hardwired or wireless connections over proprietary or non-proprietary buses or communication networks, for instance. The network request 122 asks for the HSM 128 to decrypt a specific account so that the chaincode can alter the account balance. In support of obtaining the account to decrypt, the authentication system 112 abstracts the global world state stored in the blockchain by two exposed functions, putState( ) and getState( ). The authentication system 112 also mirrors a key/value store in the peer nodes, with the key/value store containing a list of the encrypted, serialized format account objects, linked by their unique identifier.

Expressed another way, the cryptographic functions are executed by a high security hardware device: the HSM 128, and are not limited to implementation in software. With the HSM 128, the implementation of the data storage layer no longer needs to directly perform encryption and decryption of data. As a result, the implementation shown in FIG. 1 has increased security and scalability as compared to, for example, software only based security systems, and returns control to the enterprises that support the transactions. In some secure environments, the security controller circuitry 134 which controls the HSM 128 is physically housed with or near the HSM 128, e.g., in an enterprise secure data center. (Logic flow (4) in FIG. 1.)

Once the accounts for Entity A and Entity B are in decrypted format and following the balance updates in the respective accounts, the updated accounts are re-encrypted before being saved into the serialized encrypted data structure (e.g., the JSON file). To that end, the chaincode sends the encryption request 130 for the account to the security manager interface 124, which passes it to the HSM 128 for encryption. The encryption results return to the chaincode, and a new transaction is created within the bank's node, and the transaction is submitted/requested for inclusion in a new block in the blockchain. (Logic flow (5) in FIG. 1.)

Note that in this example implementation, both the Entity A account and the Entity B account are modified as a result of actions taken by the peer node which receives the transaction request. For instance, assume Bank A receives a request from their member Entity A to transfer value to Entity B associated with Bank B. Then, the Bank A peer node will request the authentication system 112 to identify and update the accounts. In response, the authentication system 112 will call the security manager API (via the URL fields noted above) to request decryption for both accounts. The chaincode then modifies the balances of both accounts, and uses the same API previously identified to request encryption from the same HSMs. After modification and encryption, the chaincode requests submission of the updated accounts to the blockchain and consensus is run to ensure that all nodes share the same account state. Finally, update accounts are mirrored between all nodes.

Before the new block with the updated accounts can be added to the blockchain, every node in the system checks that its version of the world state is identical to ensure that there are no compromised nodes. After consensus is reached (e.g., all nodes have the same copy of the data structure), the new transaction is formally injected into the blockchain. The authentication system 112 may implement, for instance, the Practical Byzantine Fault Tolerance (PBFT) algorithm to provide increased speed and scalability to reach consensus in a private, permission blockchain system. (Logic flow (6) in FIG. 1.)

After consensus has been reached and the transaction is included in the blockchain, there is a polling mechanism which consistently checks for new blocks that have been added to the data structure. If a new transaction has been added to the ledger, a message is sent to the respective parties informing them of their account changes. In one implementation, Google Cloud Messaging (GCM) performs the notification to the smartphones 102 and 104. (Logic Point 7 in FIG. 1.)

Figure 2:
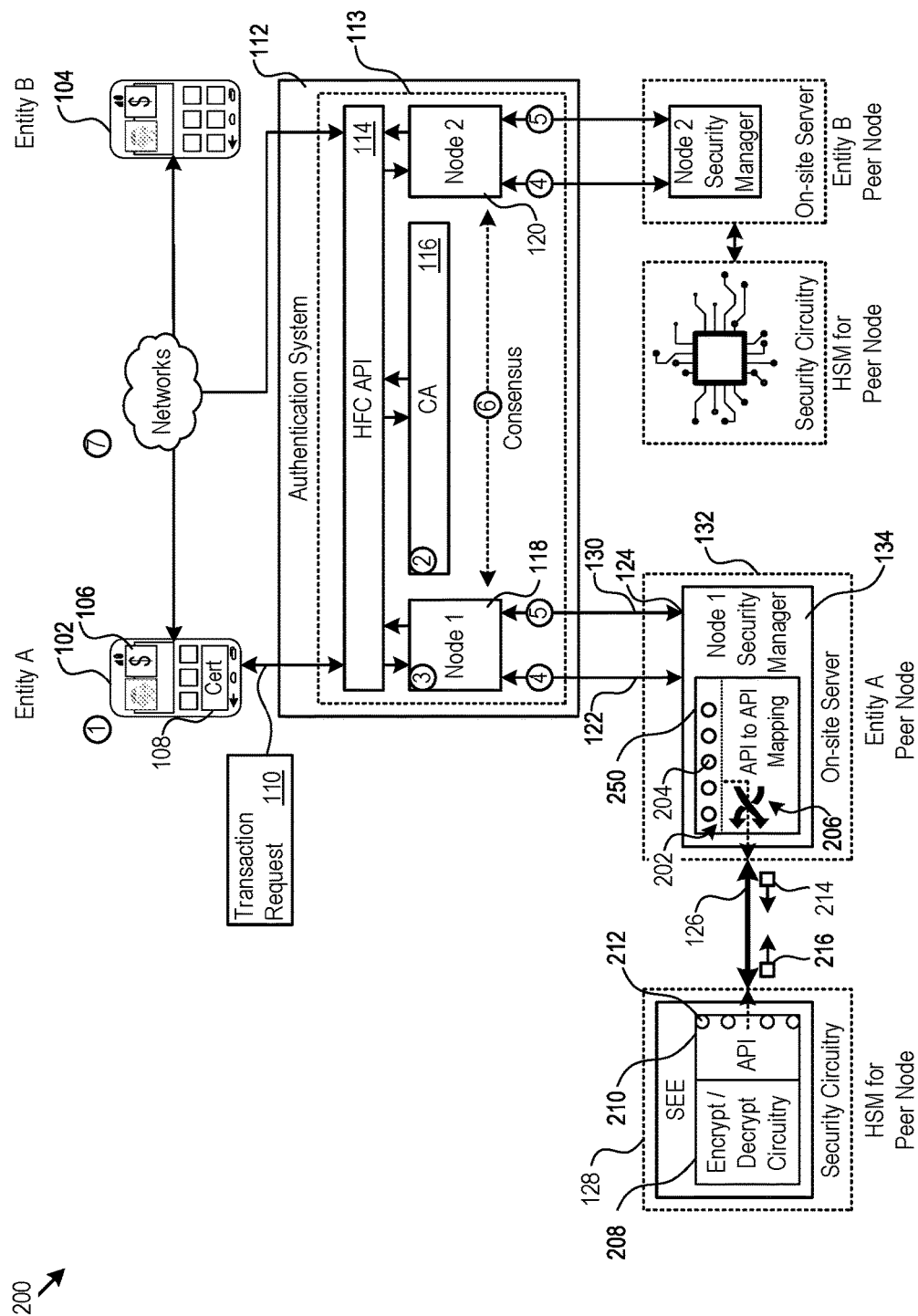
FIG. 2 illustrates an expanded view of the hardware accelerated transaction architecture.

FIG. 2 shows an expanded view 200 of the hardware accelerated transaction architecture. In FIG. 2, the Entity A peer node 132 includes the security controller circuitry 134. The security controller circuitry 134 defines an HSM interface 250 that includes a security manager API 202 and an API-to-API mapping 206. The security manager API 202 exposes a set of security manager functions, e.g., the security manager function 204 to request that the peer node 132 execute specified security functions (e.g., encrypt or decrypt data). The API-to-API mapping 206 implements, explicitly or implicitly, a security manager API to HSM API-to-API mapping tailored to the particular HSM in use, as described further below.

FIG. 2 also shows an example architecture 200 illustrating that the HSM 128 provides a secure execution environment (SEE) in which dedicated hardware security circuitry 208 performs encryption, decryption, key generation, key storage, key management, and other security functions. The HSM 128 defines an HSM API 210 that exposes a set of security functions, e.g., the HSM security function 212. The HSM security functions execute on the native HSM hardware to carry out the requested security functions 214 (e.g., decrypt data), and return security responses 216 (e.g., the decrypted data).

The API-to-API mapping 206 transforms incoming security requests received at the peer node 132 into an HSM specific function. The security controller circuitry 134 transmits the HSM specific functions to the HSM 128 in the form of the requested security functions 214. Similarly, the security controller circuitry 134 receives the security responses 216 from the HSM 128 after the HSM 128 executes the requested security function.

The HSM interface 250 provides a highly flexible and reconfigurable technical solution to the problem of connecting a peer node to a wide range of possible HSMs. By reconfiguring the API-to-API mapping 206 to point to particular functions exposed in any given HSM, the peer node 132 may be efficiently adapted for use with a wide range of security hardware. Further, multiple instances of the HSM interface 250, each with different API-to-API mappings for different HSMs, may be implemented in any given peer node to simultaneously support multiple different HSMs, e.g., for redundant operation and fault tolerance.

Figure 3:
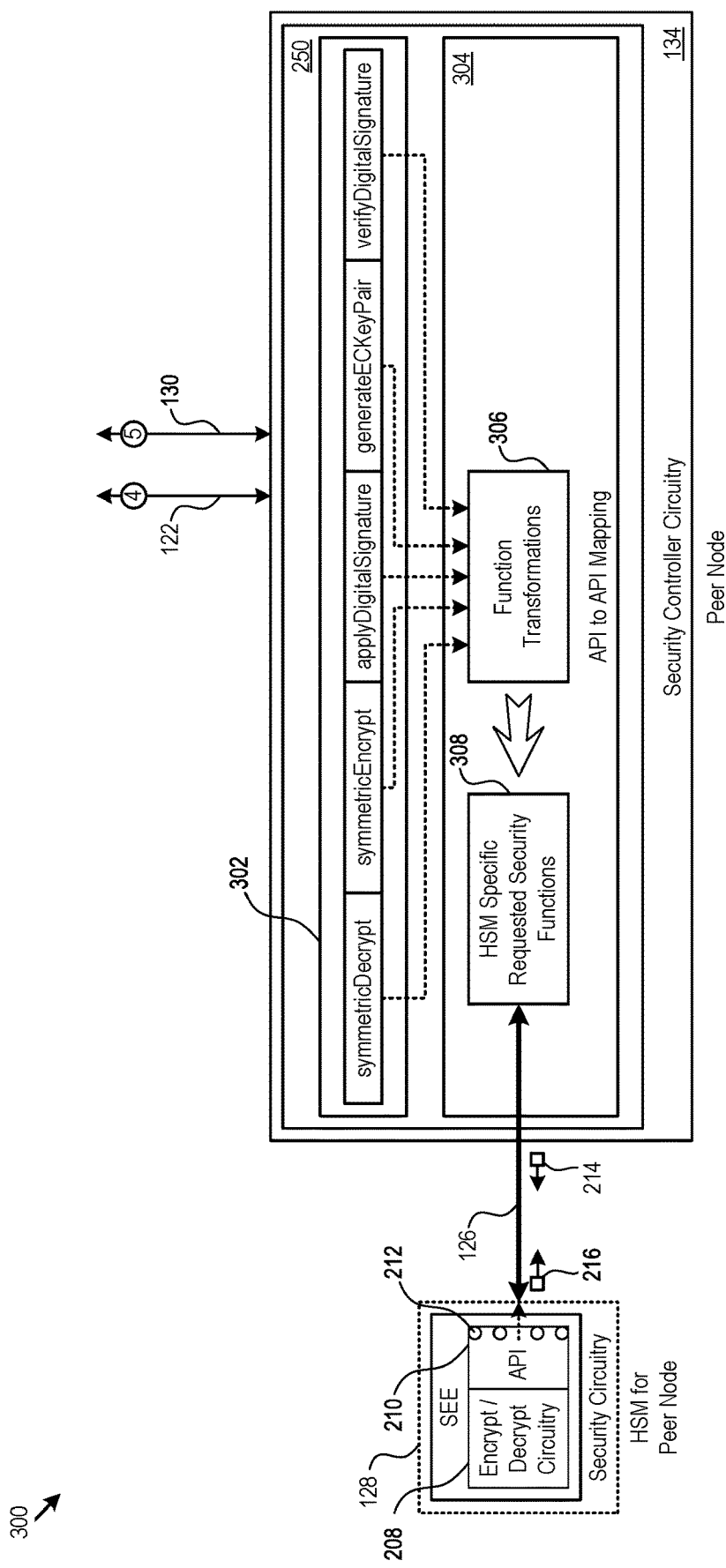
FIG. 3 shows an implementation example in which security manager circuitry exposes specific security manager functions as a security manager API.

FIG. 3 shows an implementation example 300 in which the security controller circuitry 134 exposes five specific security manager functions as the security manager API 302. Table 1, below, describes the security manager functions and indicates, in this one example, where mappings may be provided to specific HSMs or to software. That is, the security manager API 302, in concert with the API-to-API mapping 304, supports connection and messaging between multiple different HSMs. Note further that the API-to-API mapping 304 may provide redirection not only to HSM functions, but also to software implemented security functions, e.g., in cases where no HSM communicates with the peer node.

TABLE 1

| API Security Manager Function | Description | HSM Connection |
|---|---|---|
| symmetricEncrypt | Encrypt data with a symmetric key | Mapping to HSM 1<br>Mapping to HSM 2<br>Mapping to Software |
| symmetricDecrypt | Decrypt data with a symmetric key | Mapping to HSM 1<br>Mapping to HSM 2<br>Mapping to Software |
| applyDigitalSignature | Apply a Digital Signature to a message | Mapping to HSM 1 |
| verifyDigitalSignature | Verify the Digital Signature of a message | Mapping to HSM 1 |
| generateECKeyPair | Generate a key pair using the Elliptic Curve algorithm | Mapping to HSM 1 |

A specific implementation example of the security manager function symmetricEncrypt is provided below in Tables 2-5 and a specific implementation example of the security manager function symmetricDecrypt is provided below in Tables 6-9.

symmetricEncrypt

This function encrypts data with a symmetric key.

TABLE 2 symmetricEncrypt Input:

| Parameter | Description | Mandatory/Optional | Header/Url/Body | Type |
|---|---|---|---|---|
| callerIdentifier | Identifier of the caller system | O | B | String |
| hsmKeyAlias | Alias of the key to use (if not provided a default one will be used) | O | B | String |
| dataToEncrypt | Data to encrypt (hex encoded) | M | B | String |

TABLE 3 symmetricEncrypt Output:

| Parameter | Description | Mandatory/Optional | Type |
|---|---|---|---|
| resultCode | The Result code of the task | M | String |
| errorManagement | Object identifying the error | O* | Object |
| errorCode | Code that identifies error occurred | M | String |
| errorDescription | Error description | M | String |
| encryptedData | The encrypted data | M | String |

*included if resultCode is FAILED

TABLE 4 symmetricEncrypt Results

| Result Code | Result Description |
|---|---|
| SUCCESS | Service executed successfully |
| FAILED | Service execution failed |

TABLE 5 symmetricEncrypt Example

| | |
|---|---|
| Protocol | REST |
| Path | [IP:PORT]/cxf/securityManager/symmetricEncrypt |
| Method | POST |
| Content type | application/json |

Example JSON request:
{
    "callerIdentifier": "bankA",
    "hsmKeyAlias":"aeskey",
    "dataToEncrypt": "33363231"
}
Example JSON response:
{
  "baseResponse": {
      "result": "SUCCESS"
  },
  "encryptedData":
    "C8BF4E043AFA5595D21F56E16DD15571"
} symmetricDecrypt

This function decrypts data with a symmetric key.

TABLE 6 symmetricDecrypt Input:

| Parameter | Description | Mandatory/Optional | Header/Url/Body | Type |
|---|---|---|---|---|
| callerIdentifier | Identifier of the caller system | O | B | String |
| hsmKeyAlias | Alias of the symmetric key to use (if not provided a default one will be used) | O | B | String |
| dataToDecrypt | Data to decrypt (hex encoded) | M | B | String |

TABLE 7 symmetricDecrypt Output:

| Parameter | Description | Mandatory/Optional | Type |
|---|---|---|---|
| resultCode | The Result code of the task | M | String |
| errorManagement | Object identifying the error | O* | Object |
| errorCode | Code that identifies error occurred | M | String |
| errorDescription | Error description | M | String |
| decryptedData | The decrypted data | M | String |

*included if resultCode is FAILED

TABLE 8 symmetricDecrypt Results

| Result Code | Result Description |
|---|---|
| SUCCESS | Service executed successfully |
| FAILED | Service execution failed |

TABLE 9 symmetricDecrypt Example

| | |
|---|---|
| Protocol | REST |
| Path | [IP:PORT]/cxf/securityManager/symmetricDecrypt |
| Method | POST |
| Content type | application/json |
| | Example JSON request:<br>{<br>    "callerIdentifier": "bankA",<br>    "hsmKeyAlias":"aeskey",<br>    "dataToDecrypt":<br>        "C8BF4E043AFA5595D21F56E16DD15571"<br>}<br>Example JSON response:<br>{<br>  "baseResponse": {<br>    "result": "SUCCESS"<br>  },<br>  "decryptedData": 33363231<br>} |

The function transformations 306 implement a mapping from the security manager functions and corresponding objects to HSM specific requested security functions 308 defined in the HSM chosen or configured to perform the security manager function in question.

Figure 4:
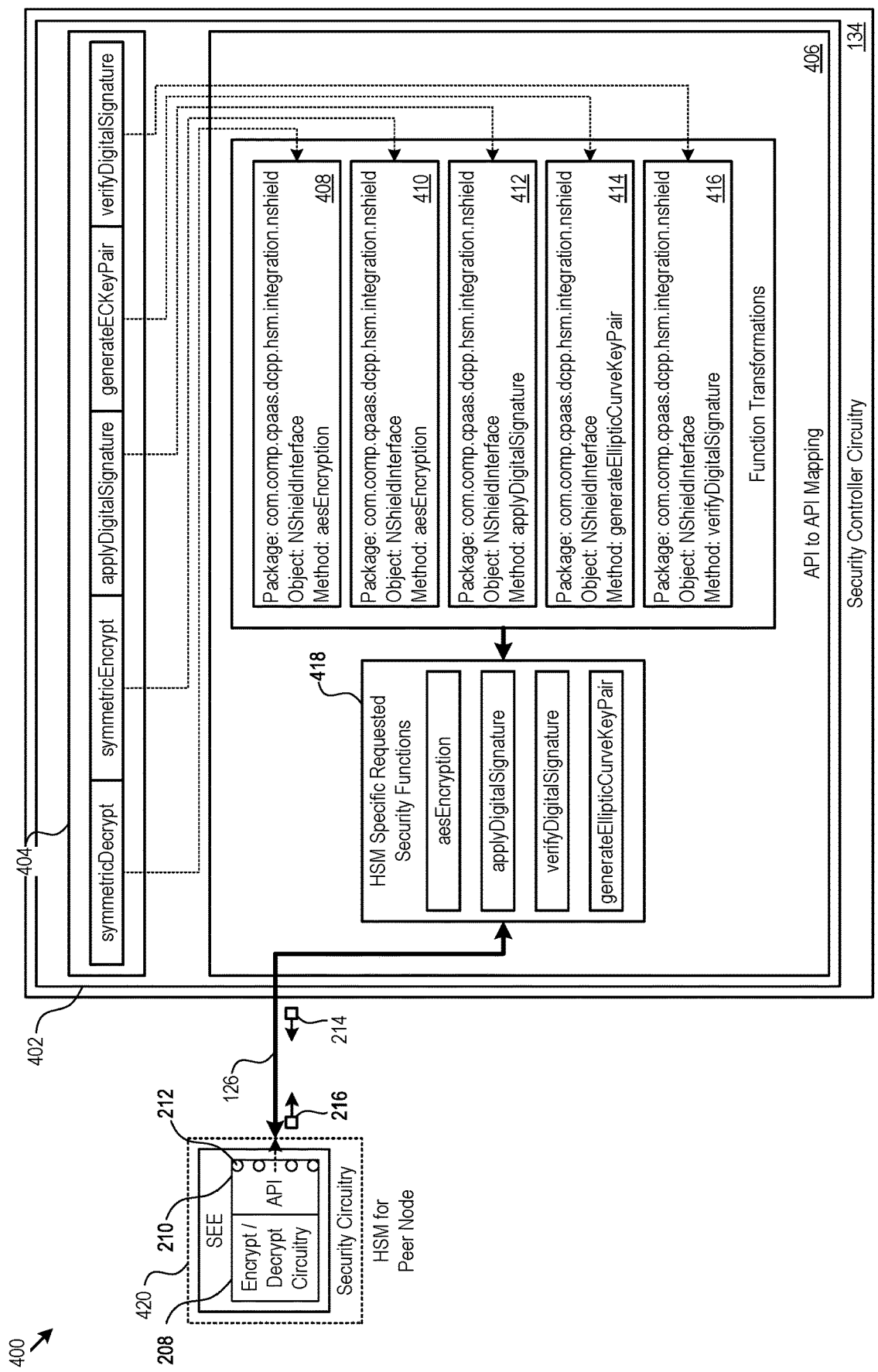
FIG. 4 shows another implementation example in which security manager circuitry exposes specific security manager functions as a security manager API.

FIG. 4 shows an implementation example 400 in which the HSM interface 402 defines a security circuitry API 404 that includes the five functions noted above. The HSM interface 402 further includes the API-to-API mapping 406. In this particular example, the API-to-API mapping 406 has implemented the symmetricDecrypt function transformation 408, the symmetricEncrypt function transformation 410, the applyDigitalSignature function transformation 412, the generateECKeyPair function transformation 414, and the verifyDigitalSignature function transformation 416. The function transformations 408-416 map each of the five functions available from security circuitry API 404 to HSM specific functions 418 defined for the particular HSM in use, in this case the HSM 420. Here, the API for the HSM 420 implements the functions called "aesEncryption" (used for both encryption and decryption), "applyDigitalSignature", "verifyDigitalSignature", and "generateEllipitcCurveKeyPair". As one specific example, an API call to the symmetricDecrypt function maps to the aesEncryption HSM API function. Table 10 summarizes the mapping from the security circuitry API 404 to the HSM 420 for this particular example.

TABLE 10

Mapping for HSM 420

| | symmetricEncrypt |
|---|---|
| HSM specific function | Package: com.comp.cpaas.dcpp.hsm.integration.nshield<br>Object: NShieldInterface<br>Method: aesEncryption |

TABLE 10-continued

Mapping for HSM 420

| | symmetricDecrypt |
|---|---|
| HSM specific function | Package: com. comp.cpaas.dcpp.hsm.integration.nshield<br>Object: NShieldInterface<br>Method: aesEncryption<br>applyDigitalSignature |
| HSM specific function | Package: com. comp.cpaas.dcpp.hsm.integration.nshield<br>Object: NShieldInterface<br>Method: applyDigitalSignature<br>verifyDigitalSignature |
| HSM specific function | Package: com. comp.cpaas.dcpp.hsm.integration.nshield<br>Object: NShieldInterface<br>Method: verifyDigitalSignature<br>generateECKeyPair |
| HSM specific function | Package: com. comp.cpaas.dcpp.hsm.integration.nshield<br>Object: NShieldInterface<br>Method: generateEllipticCurveKeyPair |

Figure 5:
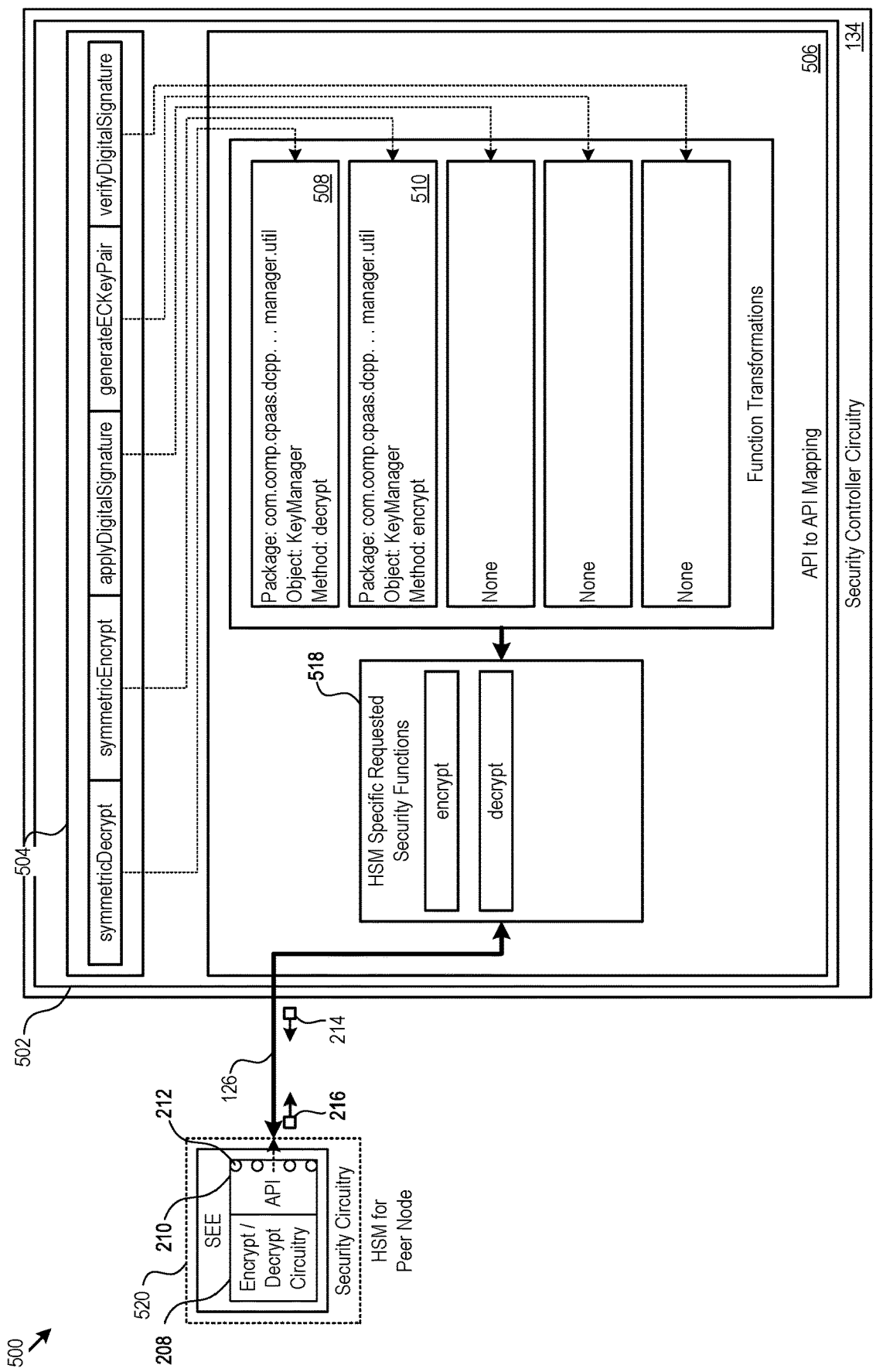
FIG. 5 illustrates an additional implementation example in which security manager circuitry exposes specific security manager functions.

FIG. 5 shows another implementation example 500 in which the HSM interface 502 defines a security circuitry API 504 that also includes the five functions noted above. The HSM interface 502 includes the API-to-API mapping 506. In this particular example, the API-to-API mapping 506 has implemented the symmetricDecrypt function transformation 508 and the symmetricDecrypt function transformation 510. Note that the API-to-API mapping 506 need not provide a mapping for every function, and in this case no mapping is defined for the applyDigitialSignature function, the generateECKeyPair function, or the verifyDigitalSignature function. Calls to those functions may be unsupported, may return an error code, may be handled by software in the peer node, may be passed to other systems, or may be handled in other manners.

The function transformations 508 and 510 map two of the five functions available from security circuitry API 504 to HSM specific functions 518 defined in the particular HSM in use, in this case the HSM 520. Here, the API for the HSM 520 implements the functions called "encrypt" for symmetric encryption and "decrypt" for symmetric decryption. As one specific example, an API call to the symmetricEncrypt function maps to the "encrypt" HSM API function. Table 11 summarizes the mapping from the security circuitry API 504 to the HSM 520 for this particular example.

TABLE 11

Mapping for HSM 520

| | symmetricEncrypt |
|---|---|
| HSM specific function | Package:<br>com.comp.cpaas.dcpp.enabler.securitymanager.manager.util<br>Object: KeyManager<br>Method: encrypt |
| | symmetricDecrypt |
| HSM specific function | Package:<br>com.comp.cpaas.dcpp.enabler.securitymanager.manager.util<br>Object: KeyManager<br>Method: decrypt |
| | applyDigitalSignature |
| HSM specific function | None |

TABLE 11-continued

Mapping for HSM 520

| | verifyDigitalSignature |
|---|---|
| HSM specific function | None |
| | generateECKeyPair |
| HSM specific function | None |

Figure 6:
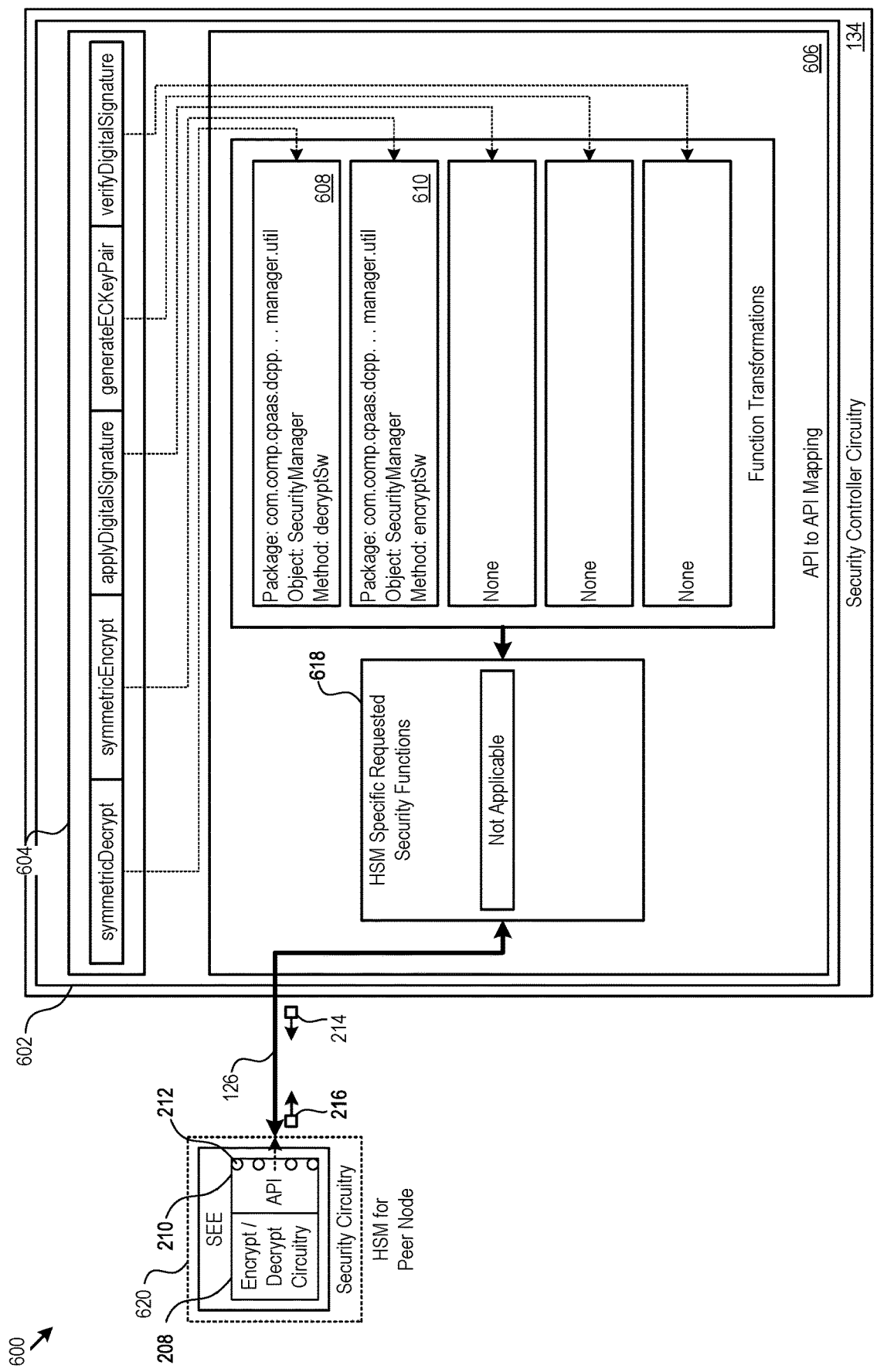
FIG. 6 illustrates an additional implementation example in which security manager circuitry exposes specific security manager functions.

FIG. 6 shows a third implementation example 600 in which the HSM interface 602 defines a security circuitry API 604. As before, the security circuitry API 604 includes the five functions noted above. The HSM interface 602 includes the API-to-API mapping 606. In this particular example, the API-to-API mapping 606 has implemented the symmetricDecrypt function transformation 608 and the symmetricDecrypt function transformation 610.

The function transformations 608 and 610 map two of the five functions available from security circuitry API 604 to software. That is, in this example, the peer node will rely on software implemented security functions, and an HSM is not called to provide hardware execution of the security functions. To that end, the function transformations 608 and 610 specify a software function to execute in response to API calls to the symmetricDecrypt function: the "decryptSw" function, and a software function to execute in response to API calls to the symmetricEncrypt function: the "encryptSw" function.

Table 12 summarizes the mapping from the security circuitry API 604 to the HSM 620 for this particular example.

TABLE 12

Mapping for HSM 620

| | symmetricEncrypt |
|---|---|
| HSM specific function | Package: com.accenture.cpaas.dcpp.enabler.securitymanager.manager.util Object: SecurityManager Method: encryptSw symmetricDecrypt |
| HSM specific function | Package: com.accenture.cpaas.dcpp.enabler.securitymanager.manager.util Object: SecurityManager Method: decryptSw applyDigitalSignature |
| HSM specific function | None |
| | verifyDigitalSignature |
| HSM specific function | None |
| | generateECKeyPair |
| HSM specific function | None |

Figure 7:
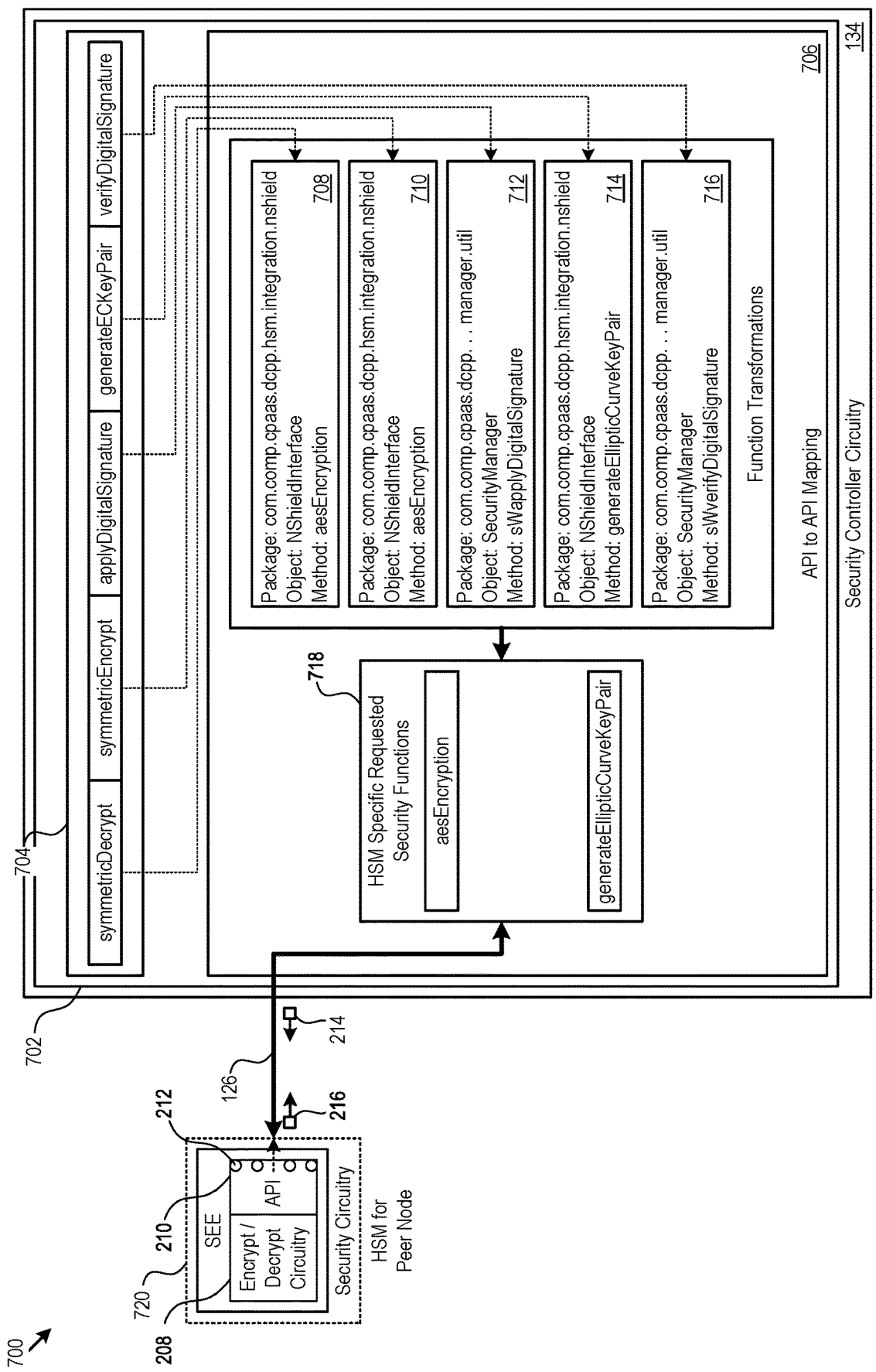
FIG. 7 shows a hybrid implementation example of the HSM interface implementing a security circuitry API.

FIG. 7 shows a hybrid implementation example 700 of the HSM interface 702 implementing a security circuitry API 704. In this particular example, the API-to-API mapping 706 has implemented the symmetricDecrypt function transformation 708, the symmetricDecrypt function transformation 710, the applyDigitialSignature function transformation 712, the generateECKeyPair function transformation 714, and the verifyDigitalSignature function transformation 716. However, in this example, the API-to-API mapping 706 uses a mix of HSM and software functions to carry out the calls to the security circuitry API 704.

The function transformations 708, 710, and 714 map three of the five functions available from security circuitry API 704 to HSM specific functions 718 for the HSM 720. More specifically, the calls to symmetricDecrypt, symmetricEncrypt, and generateECKeyPair are mapped to their counterpart functions in the HSM 720. On the other hand, the function transformations 712 and 716 handle calls to apply or verify a digital signature by mapping the calls to software functions: sWapplyDigitalSignature and sWverifyDigitalSignature, respectively. Table 13 summarizes the mapping from the security circuitry API 704 to the HSM 720 for this particular example.

TABLE 13

Mapping for HSM 720

| | symmetricEncrypt |
|---|---|
| HSM specific function | Package: com.comp.cpaas.dcpp.hsm.integration.nshield Object: NShieldInterface Method: aesEncryption symmetricDecrypt |
| HSM specific function | Package: com. comp.cpaas.dcpp.hsm.integration.nshield Object: NShieldInterface Method: aesEncryption applyDigitalSignature |
| HSM specific function | Package: com.accenture.cpaas.dcpp.enabler.securitymanager.manager.util Object: SecurityManager Method: sWapplyDigitalSignature verifyDigitalSignature |
| HSM specific function | Package: com.accenture.cpaas.dcpp.enabler.securitymanager.manager.util Object: SecurityManager Method: sWverifyDigitalSignature generateECKeyPair |
| HSM specific function | Package: com. comp.cpaas.dcpp.hsm.integration.nshield Object: NShieldInterface Method: generateEllipticCurveKeyPair |

Figure 8:
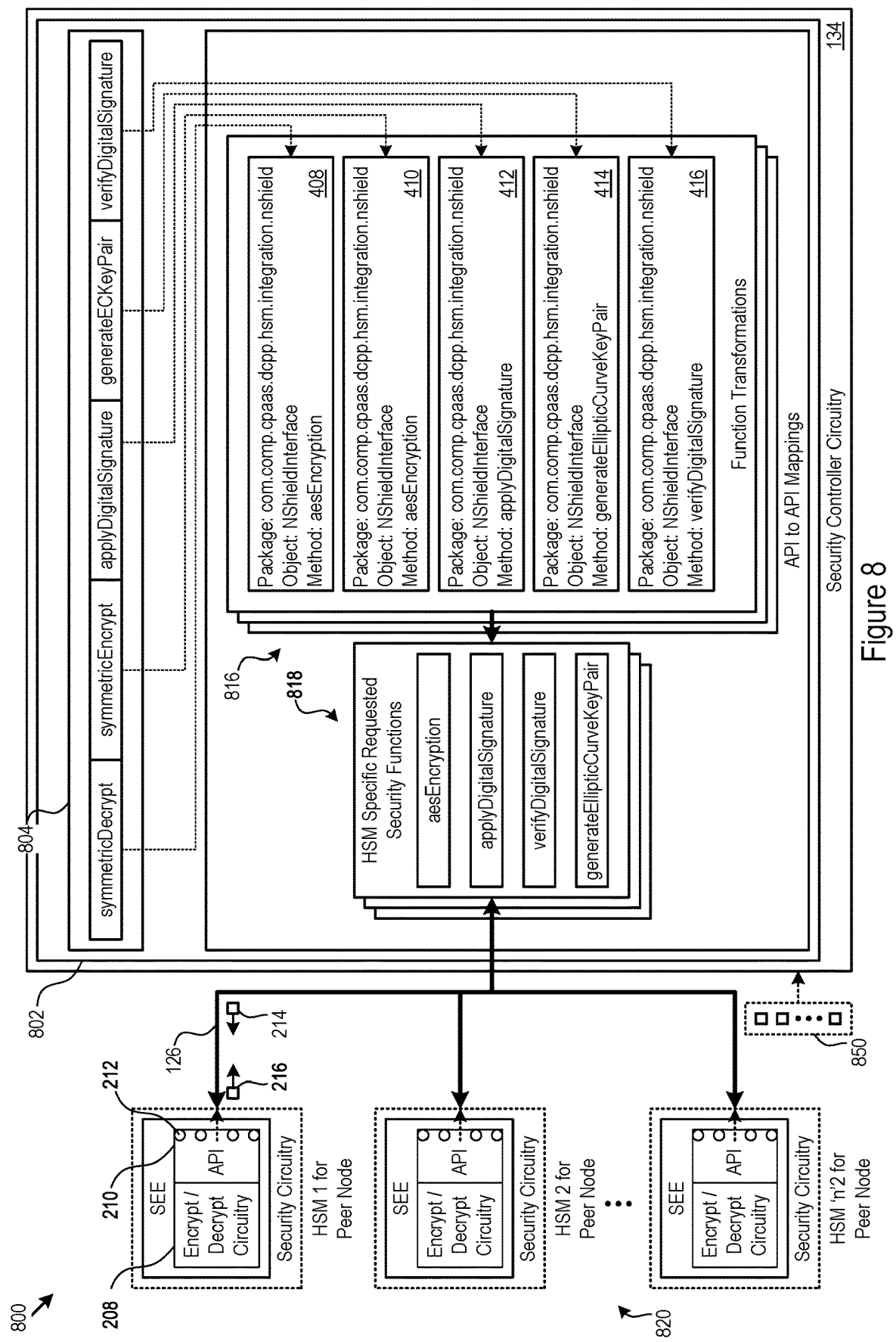
FIG. 8 shows an implementation example of the HSM interface 802 supporting multiple HSMs.

FIG. 8 shows another implementation example 800 of the HSM interface 802 including the security circuitry API 804. In this example, the HSM interface 802 supports multiple HSMs 820 for a single peer node, e.g., the HSMs 1 through HSM 'n'. The HSMs may be the same or different HSMs, and may be provided for redundancy, load balancing, fault tolerance, or for other reasons. In support of the multiple HSMs 820, the HSM interface 802 defines multiple API-to-API mappings 806, one for each unique HSM. Then, as the HSM interface 802 switches between different HSMs, the HSM interface 802 performs mappings according to the HSM in use at the time. In some implementations, configuration files 850 specify the API-to-API mappings for any pre-determined HSMs. The security controller circuitry may load one or more corresponding configuration files to define the API-to-API mappings to quickly and efficiently establish the mapping to whichever HSM the security controller circuitry will have assist with security functions.

Figure 9:
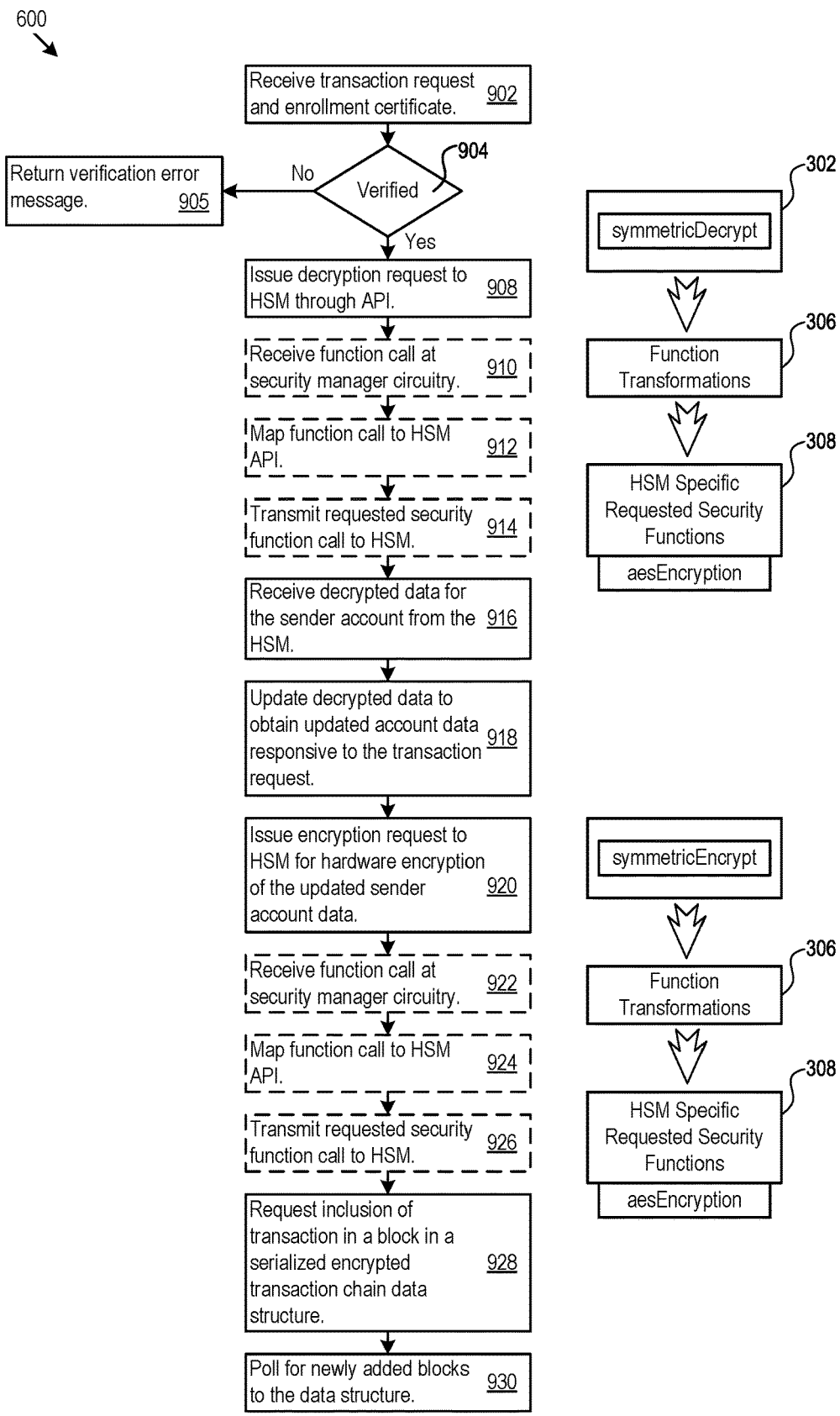
FIG. 9 shows logic that a hardware accelerated transaction processing system may implement.

FIG. 9 shows logic 900 that a hardware accelerated transaction processing system may implement. A hardware transaction processing system receives, at an authentication interface, a transaction request and an enrollment certificate (902). The system verifies a sender account linked to the transaction request (904) and may return a verification error message if verification fails (906).

The system issues a decryption request to a hardware security module for hardware decryption of the sender account (908). To that end, security manager circuitry may receive a decryption request function call (910), map the function call to the HSM API (912), and transmit the HSM specific function call to the HSM (914). The security manager circuitry receives decrypted data for the sender account from the hardware security module (916), e.g., as a return value from the HSM specific API function call.

The security manager circuitry may then perform a data update on the decrypted data. For instance, the security manager circuitry may generate updated account data responsive to the transaction request, e.g., by debiting or crediting an account (918). Once updated, the system issues an encryption request to the hardware security module for hardware encryption of the updated sender account data (920). The encryption request may pass to the HSM through an API function call, for instance. As with decryption, the API may implement a pre-determined mapping to a method implemented by one or more different HSMs for encryption. That is, the security manager circuitry receives an encryption request function call (922), translates the function call to the HSM API (924), and transmits the HSM specific function call to the HSM (926).

The system then adds the updated account data to a serialized encrypted transaction chain data structure. For instance, the system may issue a request for inclusion of the encrypted updated account data that reflects the transaction request in a block in the serialized encrypted transaction chain data structure (928). In one implementation, after consensus is reached (e.g., all nodes have the same copy of the data structure), the new transaction is handed out to all other bank nodes and is formally injected into the blockchain. The system may implement, for instance, the Practical Byzantine Fault Tolerance (PBFT) algorithm to provide increased speed and scalability to reach consensus in a private, permission blockchain system. After consensus has been reached and the transaction is included in the blockchain, a polling mechanism at the system and other like systems consistently checks for new blocks that have been added to the data structure (930).

The methods, devices, architectures, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry. [52] Various implementations have been specifically described. However, many other implementations are also possible. For instance, any of the components and functionality in the architecture may be hosted in virtual machines managed by a cloud services provider. That is, while some implementations may be completely localized within a given enterprise, other implementations are completely migrated into the cloud, or are hybrid implementations with mixed local and cloud implementation. Regarding querying devices, the smartphones applications and desktop computers noted above are just particular examples, and other querying devices may be used, including hands-free systems in vehicles, digital personal assistants in smartphones or desktop PCs, hands-free control systems for the home, and many other types of devices.

What is claimed is:

1. A method comprising:
    receiving, at a peer node of a server computer, a transaction request from an authentication system comprising a blockchain stored ledger;
    invoking the blockchain stored ledger with the peer node of the server computer,
        the blockchain stored ledger storing user account data to which the transaction request pertains, and
        the user account data stored in a serialized, encrypted format in the blockchain stored ledger;
    generating, with the server computer, a request for a security function associated with the user account data,
        the user account data encrypted with symmetric cryptography;
    mapping the request for the security function to a hardware security module (HSM) specific security function of an HSM,
        the mapping of the request for the security function performed using an API-to-API mapping, and the mapping of the request for the security function performed in response to the security function being an encryption request or a decryption request; and decrypting or encrypting, by the HSM, at least part of the user account data stored in the blockchain stored ledger, the at least part of the user account data encrypted or decrypted using a symmetric key stored in the HSM, and the decrypting or encrypting by the HSM performed in response to the HSM specific security function.

2. The method of claim 1, wherein the HSM is a plurality of different HSMs each with different respective API-to-API mapping and mapping the request for the security function to an HSM specific security function comprises selecting different respective API-to-API mapping according to a different respective HSM to which the request for the security function is directed.

3. The method of claim 1, wherein decrypting or encrypting comprises the server computer controlling the HSM, the HSM being physically housed in a datacenter of an enterprise where the computer server is also physically housed.

4. The method of claim 1, wherein decrypting or encrypting comprises initiating an HSM API that exposes the HSM specific security function.

5. The method of claim 1, wherein the peer node is identified with a uniform resource locator, the uniform resource locator included in the transaction request, and the transaction request uniquely identified with a transaction token used to sign the request.

6. The method of claim 1, further comprising:
generating, with the server computer another request for a security function associated with the user account; and
mapping the request for the another security function to another HSM specific security function of the HSM using the API-API mapping,
the mapping the request for the another security function performed in response to the another request for the security function being available from the HSM.

7. The method of claim 1, further comprising:
generating, with the server computer another request for a security function associated with the user account; and
mapping the request for the another security function to a software implemented security system included in the server computer using the API-API mapping,
the mapping the request for the another security function performed in response to the request for the security function being unavailable from the HSM.

8. The method of claim 1, further comprising:
generating, with the server computer another request for a security function associated with the user account; and
mapping the request for the another security function to another HSM specific security function of the HSM using the API-API mapping,
the mapping the request for the another security function performed in response to the request for the security function being application of a digital signature, or verification of a digital signature.

9. The method of claim 1, further comprising:
generating, with the server computer another request for a security function associated with the user account; and
mapping the request for the another security function to another HSM specific security function of the HSM using the API-API mapping in response to the request for the security function being generation of a symmetric encryption key pair.

10. A system comprising:
an authentication system;
a validating peer node configured to receive a transaction request from the authentication system,
the transaction request uniquely identified with a transaction token used to sign the request;
a blockchain, included in the authentication system, storing a ledger that includes user account data to which the transaction request pertains,
the user account data stored in a serialized, encrypted format in the blockchain;
security controller circuitry included in the validating node,
the security controller circuitry configured to:
generate a request for a security function associated with the user account data, the user account data encrypted with symmetric cryptography;
the security controller circuitry further configured to:
map the request for the security function to a hardware security module (HSM) specific security function of an HSM using an API-to-API mapping in response to the security function being an encryption request or decryption request; and
the HSM configured to:
decrypt or encrypt, in response to the HSM specific security function, at least part of the user account data stored in the blockchain using a symmetric key stored in the HSM.

11. The system of claim 10, wherein the blockchain is a stored serialized encrypted data structure encrypted with symmetric cryptography.

12. The system of claim 10, wherein the HSM comprises dedicated hardware security circuitry executable on the HSM to perform encryption and decryption based on a security manager function corresponding to the HSM specific security function.

13. The system of claim 10, wherein the HSM is a plurality of HSMs, and the API-to-API mapping maps to the HSM specific security function of one of the plurality of HSMs, and other HSM specific security functions map, by the API-to-API mappings, to other corresponding HSMs.

14. The system of claim 10, wherein the security controller circuitry is further configured to map, using the API-to-API mapping, the request for the security function to a software implemented security system included in the peer node, the request for the security function mapped to the software implemented security system in response to the security function being other than an encryption request or a decryption request.

15. The system of claim 10, wherein the security controller circuitry is further configured to map, using the API-to-API mapping, the request for the security function to another HSM specific security function of the HSM, and have the HSM execute the another HSM specific security function in response to the security function being a digital signature request, a digital signature verification request or a request to generate a symmetric encryption key pair.

16. A non-transitory computer readable storage medium configured to store instructions executable by a processor, the computer readable storage medium comprising:
instructions to receive, at a peer node of a server computer a transaction request from an authentication system;
instructions to invoke a blockchain storing a ledger, the blockchain included in the authentication system, the blockchain ledger storing user account data to which the transaction request pertains, and the user account data stored in a serialized, encrypted format in the blockchain stored ledger;

instructions to generate a request for a security function associated with the user account data, the user account data encrypted with symmetric cryptography;

instructions to map the request for the security function to a hardware security module (HSM) specific security function of an HSM using an API-to-API mapping in response to the security function being a security function available from the HSM;

instructions to direct the HSM to execute the HSM specific security function; and instructions to receive a value from the HSM, in response to the HSM specific security function, the value associated with at least part of the user account data stored in the blockchain stored ledger.

17. The non-transitory computer readable storage medium of claim 16, wherein the security request is an encryption request or decryption request, and the value being encrypted or decrypted is user account data stored in the blockchain stored ledger, the encryption or decryption accomplished using a symmetric key stored in the HSM.

18. The non-transitory computer readable storage medium of claim 16, wherein the security request is a request for a digital signature or a request for verification of a digital signature, and the value is a digital signature from the user account data stored in the blockchain stored ledger, or verification of a match with the digital signature from the user account data stored in the blockchain stored ledger.

19. The non-transitory computer readable storage medium of claim 16, wherein the instructions to direct the HSM to execute the HSM specific security function comprises instructions to make an API call to an HSM specific API function present in the HSM, the HSM specific API function corresponding to the HSM specific security function.

20. The non-transitory computer readable storage medium of claim 16, wherein the HSM comprises a plurality of HSMs, and the instructions to map the request for the security function to the HSM specific security function of an HSM comprises instructions to load corresponding configuration files for each of the respective HSMs, each of the configuration files defining the API-to-API mapping for a respective one of the HSMs.

* * * * *